Patented Sept. 1, 1936

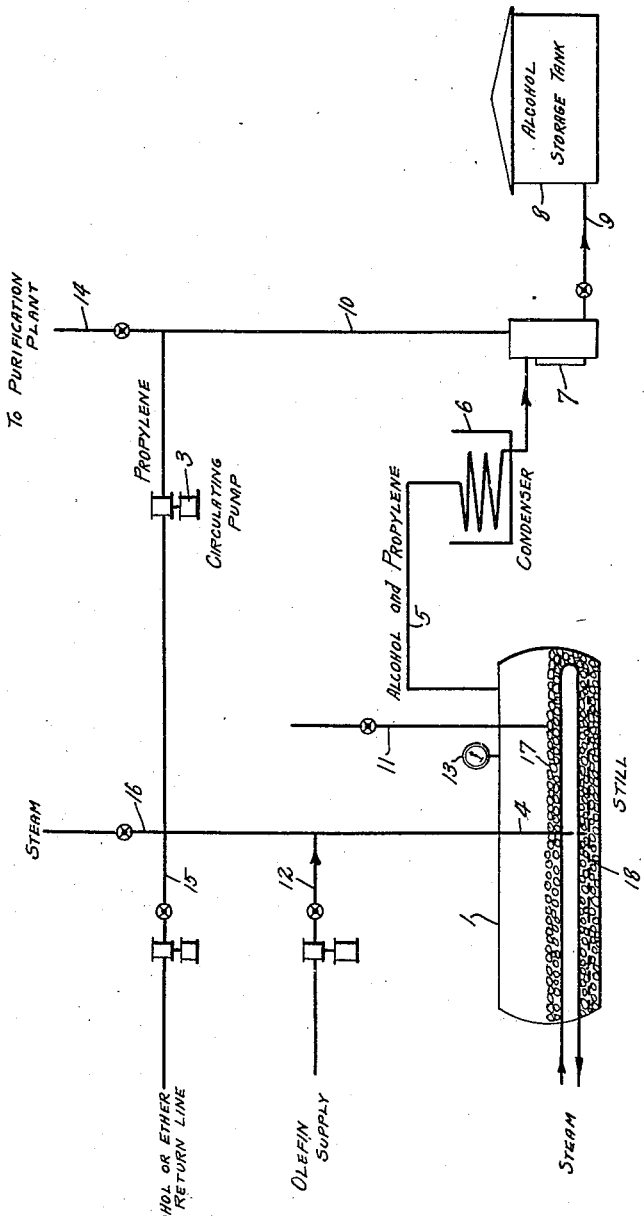

2,052,806

UNITED STATES PATENT OFFICE 2,052,806

PROCESS OF CATALYTIC HYDRATION OF PROPYLENES

William H. Shiffler and Melvin M. Holm, Berkeley, Calif., assignors to Standard Oil Company of California, San Francisco, Calif., a corporation of Delaware Original application August 22, 1930, Serial No. 477,147. Divided and this application December 9, 1933, Serial No. 701,718

4 Claims. (Cl. 260—156)

This invention relates to a process for the catalytic hydration of propylene to produce isopropyl alcohol.

This application is a division of our co-pending application, Serial No. 477,147, filed August 22, 1930.

Heretofore, various attempts have been made to convert these lower olefins to alcohols. With the use of sulphuric acid these attempts have been largely through the absorption of the olefins in relatively strong sulphuric acid with a consequent formation of the alkyl sulphuric acids. The alkyl sulphuric acid has then been diluted with the hydrolysis of the alkyl sulphuric acids to alcohol.

The alcohols have then been distilled from the dilute sulphuric acid solutions thus produced. This procedure includes several inherent disadvantages, among which are, first, the fact that considerable quantities of the olefins are polymerized to oils by which the ultimate yield of alcohols is reduced; second, three separate steps are involved in the process requiring considerable expense for equipment and operation, and, third, large quantities of dilute sulphuric acid are produced which must be concentrated for re-use in the process.

It is the general object of the present invention to provide a process by which these lower olefins may be hydrated into alcohols in a single operation and in which the polymerization of the olefins to oil is practically eliminated, and by which the yield of alcohols is very materially increased and the cost of equipment and operation of the process materially reduced.

By the process of the present invention, we are able to produce high yields of alcohol from the lower olefins without substantial polymerization of the olefins to oils and without the necessity of dilution of the sulphuric acid used so that the cost incidental to re-concentrating sulphuric acid is removed.

In the hydration of olefins and alcohols by a three-step process which involves the absorption of the olefins in acid, the dilution of the acid and distillation of the alcohols from the diluted acid, it is recognized that concentrated sulphuric acids and relatively low temperatures should be employed such, for example, as acids containing about between 95% and 100% sulphuric acid and temperatures of from 90° F. to 200° F., depending upon the particular olefin to be absorbed. An attempt is made to secure a complete absorption of the olefins by the concentrated sulphuric acid in one passage of the olefins into the acid. Generally considered, the process of the present invention embodies the use of a comparatively dilute sulphuric acid, preferably containing not over 80% sulphuric acid and temperatures sufficient to cause the volatilization of the hydration products as they are formed. The olefins are passed continuously through the sulphuric acid, preferably accompanied by the addition of sufficient steam to maintain the concentration of the acid constant throughout the process. In this manner, only part of the olefins are absorbed by the sulphuric acid during a single passage of the olefins through the acid, this part being hydrated and volatilized without the necessity of any separate dilution of the acid.

By a continuous condensation from the gas of the hydration products produced and a continuous re-circulation of the unreacted olefins back for further contact with the acid a substantially complete hydration of the olefins may be caused to take place.

In the process the sulphuric acid remains unchanged in strength and quantity, thus operating as a catalyst for the direct hydration of the olefins.

It has also been discovered that the conversion of the ethylene to ethyl ether and ethyl alcohol is an equilibrium reaction and that by maintaining in the ethylene gas passed through the acid a correct quantity of either ether or alcohol, the reaction may be caused to produce either solely ether or solely alcohol. It has also been discovered that the conversion of propylene to isopropyl alcohol is an equilibrium reaction, but that very little isopropyl ether is produced under the conditions most favorable for the production of isopropyl alcohol.

It has been further discovered that while in ultimate effect the process is a direct catalytic hydration of the olefins, it takes place apparently in two steps occurring simultaneously in the process, the first step consisting of an absorption of the olefins by the acid and the second step the distillation of the alcohols from the acid. A sufficient surface of sulphuric acid may be supplied to insure adequate contact with all of the olefin gas and yet the rate of hydration of the olefins may be so slow as to render the process commercially impractical.

When, however, a considerable body of sulphuric acid is supplied for contact with the gas a high rate of production may be obtained.

It has been further found that the catalytic hydration of olefins takes place best with acids between 20 and 80% in strength. The weaker acids provide a lower production rate, while, on the other hand, the stronger acids have a tendency to polymerize or oxidize the olefins. It has been further found that by operating the process under a pressure which is high, the rate of production of the process may be materially increased. High pressures have also a tendency to increase the ratio between the amount of ether and the amount of alcohol produced.

The present invention will best be understood from a description of one or more examples of the invention. For this purpose, we have hereafter set forth the preferred form or forms of processes embodying the invention. The process is described in connection with the accompanying drawing, in which:

The figure is a diagrammatic view of an apparatus suitable for conducting the process.

In the drawing, 1 represents a contacting chamber, in this instance a vessel preferably lined with lead and brick. The chamber may be about two-thirds filled with suitable packing material such as stoneware Raschig rings 17. The contents of the chamber may be supplied with heat by a suitable means, such as the closed steam coil 2. Olefin gas is supplied through lines 12 and 3, being distributed evenly through the chamber by means of a perforated distributing coil 18. Steam from line 16 is passed into the chamber through lines 4 along with the olefin gas. Unreacted olefin gas and steam mixed with alcohol and ether vapors together with impurities or diluents carried in the gas fed, leave the chamber through line 5 and enter the condenser 6 where most of the alcohol, ether and steam are condensed. The condensed liquid is separated from the gas in a drum 7 and sent through line 9 to the storage tank 8. The unreacted gas leaves the top of the drum 7 through line 10 where it may be passed by means of a circulating blower 3 back to the chamber through line 4 and the cycle repeated. If the olefin gas contains impurities, such as ethane and methane or propane, part of the cycle of gas may be returned to a purification plant through line 14. A pressure gauge 13 indicates the pressure in the system. The condensate is pumped from the storage tank 8 to a still, not shown, where the alcohol and ether may be separated. If it is desired to return either the alcohol or ether to chamber 1, this may be done through line 15.

The process will be described as applied to the production of isopropyl alcohol from propylene. The catalyst employed is preferably sulphuric acid of a strength between 20% and 75% or 80%. The preferred operating conditions are at 55% sulphuric acid. At an acid strength of 46% the rate of production is only about one half that at 55%.

The reaction proceeds more slowly the weaker the acids, acids below 20% producing a negligible quantity of alcohol, while stronger acids, especially at high temperatures, tend to polymerize and oxidize the propylene and so reduce the yield of alcohol.

There are several ways in which the catalyst may be contacted with propylene gas, but it is important that not only a large reactive surface of the catalyst and propylene be obtained but that there be an ample volume of sulphuric acid in the process. One method of contacting the gas with the acid is to fill the chamber about two-thirds full of sulphuric acid and bubble the gas through the acid. Preferably, the chamber also contains sized acid-proof screenings or small stoneware Raschig rings which are immersed in the acid. Reaction rates have been obtained by passing the olefine through a large body of sulphuric acid containing a suitable packing material which are twenty times the reaction rates, which are obtained when sulphuric acid is contacted with an olefine gas by passing the gas upwardly through a shower of acid.

It appears that the catalytic reaction is a two-step process, and unless there is a large body of acid present a low reaction rate will be obtained, even when all of the gas is thoroughly contacted with the acid. Preferably, the acid is maintained at a temperature of between 200 and 270° F., or above or about preferably 240° F. At a temperature of 210° F. the production rate is only about two-thirds that of 240° F.

The entire process is preferably maintained under a pressure above atmospheric. At a pressure of thirty pounds per square inch above atmospheric production is about two and a half times that at atmospheric pressure. In addition, the strength of isopropyl alcohol produced is increased about two and a half times. The propylene gas may be pure propylene gas, if the same is obtainable, but we prefer to employ a gas produced by fractionation of the gases obtained from the hydrocarbon cracking processes. Simultaneously with the introduction of propylene, we introduce sufficient steam or water into the catalyst to compensate for the water lost from the acid during the process and thus maintain the acid throughout the process at a constant strength. It is desirable to introduce water or steam continuously or simultaneously with the propylene, but since there is a wide range of acid strengths over which the process is satisfactorily operable the water or steam may be added intermittently or from time to time.

As a check as to whether the proper amount of water or steam is being added to the process, the strength of acid in the chamber may be analyzed from time to time by withdrawing samples of the acid through the line 11.

There issues from the sulphuric acid catalyst mixed vapors of isopropyl alcohol and unconverted propylene and diluent gases, if such diluent gases exist in the gas being processed. The stream of gases and vapors passes out of the chamber to the condenser and the vapors condense so that alcohol and ether are collected. The gases, after separation of the alcohol and ether, may be returned to the process for further conversion.

Under the operating conditions that we have found most suitable for the process, only about 1–4% of propylene is converted to alcohol during the single passage of the propylene through the catalyst. It is important that the alcohol and ether be condensed from the vapors leaving the chamber before the unreacted gas is recycled or again contacted with the acid, as apparently but little further conversion of propylene into alcohol can take place while the alcohol produced remains with the propylene gas.

By condensing the alcohol from the propylene gas and returning the same to the system with sufficient make-up gas to maintain a constant pressure on the system, the process is rendered continuous and a high yield of hydration products may be obtained from the propylene. Impurities in the gas, such as methane, ethane, and the like, are prevented from building up in the system by a release of part of the gas to be recycled or by returning a part or all of the gas to a purification plant through the line 14. In the purification plant the gas may be fractionated to concentrate its propylene content and then the gas may be returned to the process.

The rate of release of such gas for purification may be determined by the alcohol strength desired in the condenser and by the amount of impurities in the make-up gas, and this may be conveniently done by analyzing the gas in the system at intervals and maintaining the olefin content constant. As the impurities build up in the system, the partial pressure of the propylene is reduced and the ratio of water to alcohol in the condenser increases. The isopropyl alcohol collected in the storage tank is separated by distillation.

When the propylene gas is first passed through fresh acid in the chamber, a considerable period of time generally elapses before the alcohol production reaches its maximum. Thus, several hours' time usually passes before the alcohol production arrives at a maximum value. The alcohol production apparently does not reach a maximum until sufficient propylene has been absorbed and retained by the acid to reach a certain maximum formation of alkyl sulphuric acid. The production of alcohol is dependent upon the decomposition of the alkyl sulphuric acid and a high rate of production is dependent upon having a large volume of acid present in which this decomposition reaction may be taking place.

In general, with propylene it will be seen that the process may be satisfactorily operated with stronger or weaker acids than those specified in the examples given above and with pressures higher or lower than those specified. With the weaker acids, higher temperatures and/or higher pressures should be employed for obtaining efficient results.

While the process herein described is well adapted for carrying out the various objects and advantages of the present invention, it is to be understood that we do not wish to be limited to the embodiment set forth, and the invention is of the scope of the appended claims.

We claim:

1. A process of manufacturing isopropyl alcohol from propylene, which process comprises bringing propylene containing gas into contact with dilute sulphuric acid at a superatmospheric pressure and a temperature above about 240° F. sufficient to cause the absorption of a minor percentage of such propylene with a simultaneous transformation of the propylene to an alkyl sulphate and then a transformation of the alkyl sulphate into isopropyl alcohol, and the vaporization and removal of such isopropyl alcohol from the acid along with the unreacted propylene, removing from the unreacted propylene a part at least of such isopropyl alcohol, recycling the propylene for further contact with sulphuric acid, and adding water or steam to the acid sufficient to compensate for that vaporized by the gas, the sulphuric acid being maintained in substantially uniform concentration during contact with the propylene.

2. A process of manufacturing isopropyl alcohol from propylene, which consists in bringing a propylene containing gas into intimate contact with the body of sulphuric acid catalyst at a strength and at a temperature above about 240° F. sufficient to cause a minor percentage only of the propylene to be absorbed by the acid in one passage and to cause simultaneously the absorbed propylene to be finally converted into isopropyl alcohol which is vaporized from the acid and passes off with the unreacted propylene, such absorption taking place at a pressure above atmospheric, condensing a part at least of the isopropyl alcohol from the unreacted propylene, and recycling the unreacted propylene for further contact with the catalyst, the sulphuric acid being maintained in substantially uniform concentration during contact with the propylene.

3. A process of manufacturing isopropyl alcohol from propylene, which comprises continuously passing propylene into contact with a substantial body of sulphuric acid at a temperature and concentration of acid sufficient to cause hydration of a minor percentage only of the propylene and volatilization of the isopropyl alcohol formed from the propylene along with the unconverted propylene gas, continuously condensing the isopropyl alcohol from the propylene gas and continuously recycling the gas again into contact with sulphuric acid while supplying sufficient fresh propylene containing gas to maintain a substantially constant pressure above atmospheric throughout the process.

4. A process of manufacturing isopropyl alcohol from propylene, which comprises continuously passing propylene into contact with sulphuric acid at a temperature and concentration of acid sufficient to cause hydration of a minor percentage only of the propylene and volatilization of isopropyl alcohol along with the unconverted propylene gas, continuously condensing hydration products from the propylene gas and continuously recycling the gas again into contact with the sulphuric acid while supplying sufficient fresh gas to maintain a substantially constant pressure above atmospheric throughout the process, the sulphuric acid being maintained between 20 and 80% in strength by the passage of sufficient water vapor providing material as to compensate for the vaporization of water from the acid during the process.

WILLIAM H. SHIFFLER.
MELVIN M. HOLM.